United States Patent
Drobny et al.

(10) Patent No.: US 7,551,998 B2
(45) Date of Patent: Jun. 23, 2009

(54) SYSTEM HAVING A CONTROL UNIT AND A STATUS ACQUISITION DEVICE AS WELL AS A METHOD FOR TESTING/DIAGNOSING SUCH A SYSTEM

(75) Inventors: Wolfgang Drobny, Heilbronn (DE); Ruediger Giesel, Stuttgart (DE); Reiner Marchthaler, Gingen (DE); Michael Meyer, Altdorf (DE); Klaus Loewen, Balingen (DE)

(73) Assignees: Robert Bosch GmbH, Stuttgart (DE); Daimlerchrysler AG, Stuttgart (DE)

( * ) Notice: Subject to any disclaimer, the term of this patent is extended or adjusted under 35 U.S.C. 154(b) by 89 days.

(21) Appl. No.: 10/484,973

(22) PCT Filed: Jul. 12, 2002

(86) PCT No.: PCT/DE02/02548

§ 371 (c)(1),
(2), (4) Date: Sep. 7, 2004

(87) PCT Pub. No.: WO03/016099

PCT Pub. Date: Feb. 27, 2003

(65) Prior Publication Data

US 2005/0010345 A1    Jan. 13, 2005

(30) Foreign Application Priority Data

Jul. 26, 2001    (DE) ................................. 101 36 324

(51) Int. Cl.
*G01M 17/00* (2006.01)
*G06F 11/30* (2006.01)

(52) U.S. Cl. ........................... 701/45; 701/29; 702/183; 280/735

(58) Field of Classification Search .................. 701/45, 701/29, 33, 35; 340/436, 541, 425.5, 3.3, 340/3.72; 180/274, 271; 280/735, 804; 714/29; 700/23, 26; 709/223; 702/189, 85, 127, 702/183
See application file for complete search history.

(56) References Cited

U.S. PATENT DOCUMENTS

| 4,748,843 | A | * | 6/1988 | Schafer et al. | 73/117.3 |
| 4,843,557 | A | * | 6/1989 | Ina et al. | 701/114 |
| 4,846,498 | A | * | 7/1989 | Fohl | 280/801.2 |
| 6,056,079 | A | * | 5/2000 | Cech et al. | 180/273 |
| 6,088,639 | A | * | 7/2000 | Fayyad et al. | 701/45 |
| 6,123,357 | A | * | 9/2000 | Hosoda et al. | 280/730.2 |
| 6,141,608 | A | * | 10/2000 | Rother | 701/33 |

(Continued)

FOREIGN PATENT DOCUMENTS

DE    198 21 500    1/1999

(Continued)

*Primary Examiner*—Tuan C To
(74) *Attorney, Agent, or Firm*—Kenyon & Kenyon LLP

(57) ABSTRACT

In a system having a control unit for triggering a restraint system for vehicles, and having a status acquisition device, such as a seat occupation device, from which a data record describing the presence or the non-presence of the condition is transmitted to the control device, upon a defined stimulation signal from the control unit to the status acquisition device the latter transmits a second data record to the control unit, which corresponds to the type characteristics and the type data. Thereby, type data are able to be recorded even in the case of a status acquisition device installed in an obstructed way in a motor vehicle.

10 Claims, 2 Drawing Sheets

U.S. PATENT DOCUMENTS

| | | | |
|---|---|---|---|
| 6,263,271 B1* | 7/2001 | Oka et al. | 701/45 |
| 6,266,592 B1* | 7/2001 | LeMense | 701/45 |
| 6,509,747 B2* | 1/2003 | Nagai et al. | 324/687 |
| 6,553,290 B1* | 4/2003 | Pillar | 701/33 |
| 6,556,950 B1* | 4/2003 | Schwenke et al. | 702/183 |
| 6,695,412 B2* | 2/2004 | Barger et al. | 297/484 |
| 2002/0103590 A1* | 8/2002 | Schondorf et al. | 701/45 |
| 2003/0040854 A1* | 2/2003 | Rendahl et al. | 701/29 |
| 2003/0114965 A1* | 6/2003 | Fiechter et al. | 701/29 |
| 2004/0068350 A1* | 4/2004 | Tomson | 701/1 |

FOREIGN PATENT DOCUMENTS

| | | |
|---|---|---|
| DE | 198 13 962 | 9/1999 |
| DE | 199 63 267 | 7/2000 |

* cited by examiner

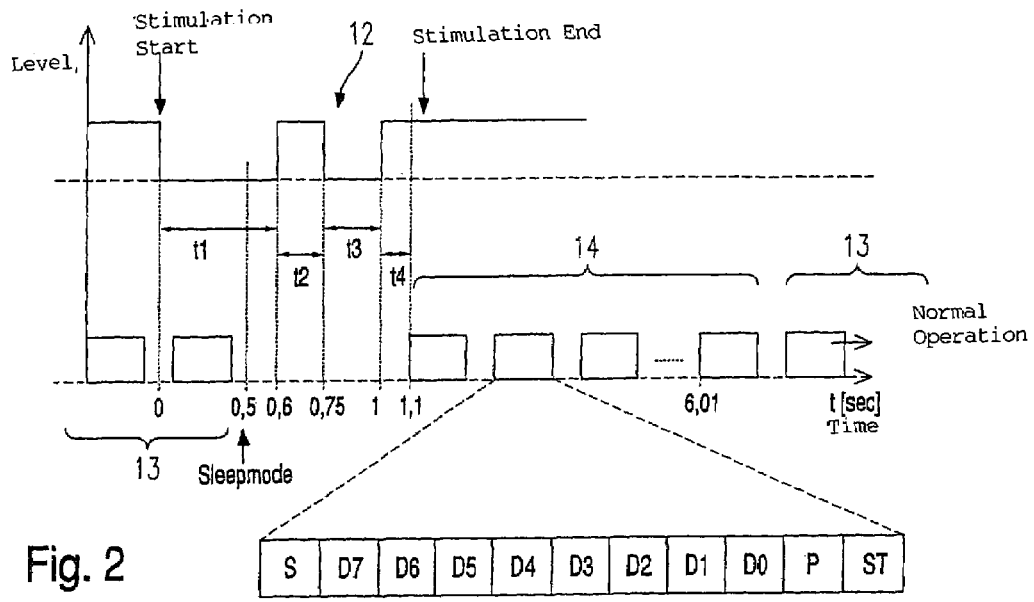

Fig. 2

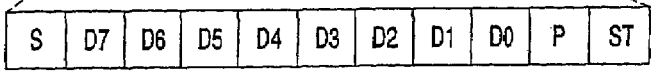

| Byte | Content | Format | Code |
|---|---|---|---|
| 1 | Start-Identifier | HEX | 0xCA |
| 2 | Serial Number 1 | BCD | |
| 3 | Serial Number 2 | BCD | |
| 4 | Serial Number 3 | BCD | |
| 5 | Serial Number 4 | BCD | |
| 6 | No. 10 | BCD | |
| 7 | No. 20 | BCD | |
| 8 | No. 30 | BCD | |
| 9 | No. 40 | BCD | |
| 10 | No. 50 | BCD | |
| 11 | HW-Revision Level KW | BCD | |
| 12 | HW-Revision Level Year | BCD | |
| 13 | HW Revision Level KW | BCD | |
| 14 | HW Revision Level Year | BCD | |
| 15 | Manufacturing Date Year | BCD | |
| 16 | Manufacturing Date Month | BCD | |
| 17 | Manufacturing Date Day | BCD | |
| 18 | Preload / Test Element OK | Bit D0 / Bit D1 | |
| 19 | REV. OC | BCD | |
| 20 | Check Sum | HEX | |
| 21 | Stop Identifier | HEX | 0xCE |

Fig. 3

SYSTEM HAVING A CONTROL UNIT AND A STATUS ACQUISITION DEVICE AS WELL AS A METHOD FOR TESTING/DIAGNOSING SUCH A SYSTEM

BACKGROUND INFORMATION

The present invention relates to a system having a control unit for triggering a restraint system, assigned to a seat of a vehicle, upon the recording of an event to be interpreted as an impact on an obstacle. The system includes a status acquisition device that is connected to the control unit via a transmission channel. In order to activate the triggering only when the condition is present, the status acquisition device, during operation, regularly transmits to the control unit a corresponding data record indicating the presence or non-presence. Furthermore, the present invention relates to a method for the testing/diagnosis of a system of this kind.

A control unit typically triggers the ignition of at least one propellant charge of an air bag when criteria have been recorded which are to be interpreted as an impact of a vehicle on an obstacle. In order to avoid unnecessary releases, using suitable recording devices, it is additionally determined whether a person to be protected is actually sitting in the respective seat, that is, whether the seat is occupied. The activation of such restraint systems, such as a front air bag, a side air bag, belt tensioners and the like, has also been made dependent upon other recordable conditions, for example, whether a sitting person is disposed in an ideal sitting position or not, and the like. Usually, information on the condition to be recorded is transmitted regularly in the form of a data record having digital signals, such as every 240 ms, via the transmission channel to the control unit, the transmission channel in practice being formed by a conductor. In order to ensure orderly functioning, it should be possible to make a test and a diagnosis. In such a diagnosis, it may be necessary to be able to allocate the diagnosis result uniquely to the tested device. In this connection, it is extremely desirable if the device submitted to a diagnosis can indeed be identified, even if it is built into the vehicle, perhaps also for carrying out statistical evaluations. For this, it may be necessary to be able to determine so-called type characteristics of the device to be tested, such as its serial number, manufacturing date, vendor and more of the like.

Up to now it has been necessary to register the appropriate type characteristics by hand, expediently before mounting the device on the vehicle, which is clearly very cumbersome and costly. The correction of the registered type characteristics, especially in the case of numerous devices, is no longer reliable once a vehicle has been delivered, and one or another status acquisition device has been exchanged. This is not even guaranteed if the vehicle is maintained in authorized repair shops.

SUMMARY

It is an object of the present invention to refine the above-named system and the above-named method in such a way that, if necessary, all the respective type characteristics are made available in a simple manner.

In accordance with the present invention, upon a specified stimulation signal, the status acquisition device transmits to the control unit a second data record corresponding to the type characteristics of the status acquisition device.

In this context, the present invention starts from the recognition that, in the diagnosis case, a quick recording of the presence or non-presence of the condition has subordinate meaning, that is, the separation in time between two successive transmissions of the first data record may be relatively large, meaning also that a transmission of the first data record during the transmission of the second data record can be done without.

BRIEF DESCRIPTION OF THE DRAWINGS

The present invention is explained in greater detail with reference to the exemplary embodiment shown in the drawings.

FIG. 2 shows schematically the allocation of stimulation signals to the first data record and the second data record.

FIG. 3 shows an example of the construction and the format of the second data record.

DETAILED DESCRIPTION OF EXAMPLE EMBODIMENTS

Figure 1:
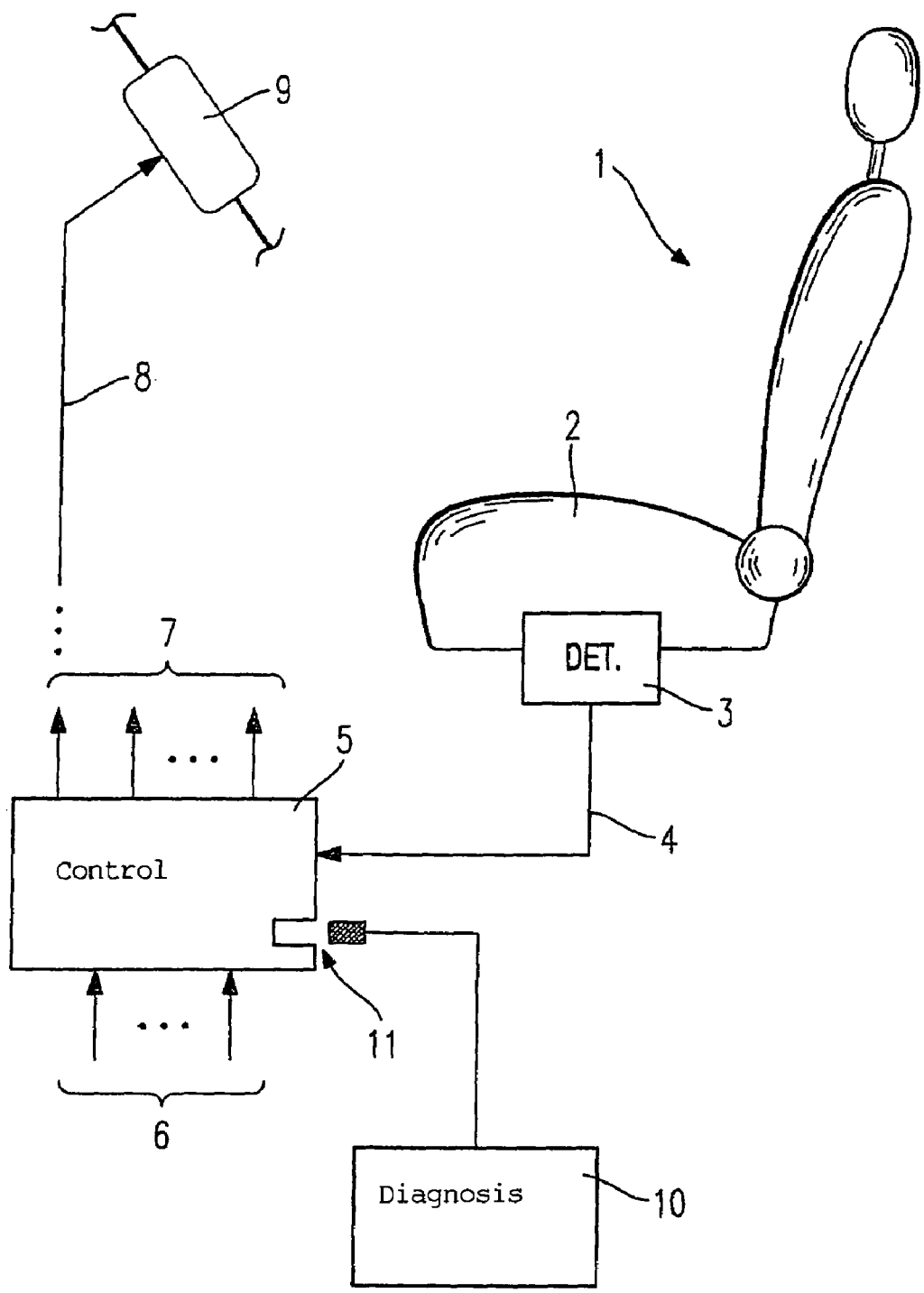
FIG. 1 shows schematically an example system according to the present invention as used in a motor vehicle.

FIG. 1 shows schematically seat 1 of a motor vehicle, to whose seat surface 2 a status acquisition device 3 is allocated. With the aid of status acquisition device 3 it is detected, in a conventional manner, whether there is a person (not shown) in seat 1 or not, and a corresponding signal is supplied to a control unit 5 via a transmission channel 4. This control unit 5 receives additional condition signals 6, such as information signals about the actual speed of the vehicle, the relative speed compared to a preceding vehicle, the condition of the seat-belt buckle, etc., as is conventional. Control unit 5 processes the received signals so as to emit output signals 7, especially for supplying restraint systems and, in particular, for triggering them in the case of a crash. For example, one of these signals can be supplied to a front air bag system 9, via a connecting line 8, that is built into the vehicle opposite seat 1. During operation, if, by evaluating signals 6, control unit 5 determines that there has been an event that is to be interpreted as a crash, that is, a dangerous impact on an obstacle, front air bag 9 is triggered by one of output signals 7 if a person is sitting in seat 1 and has to be protected. Other output signals 7 of control unit 5 are used for triggering other air bag systems, for instance, a side air bag or for releasing a seat-belt tensioning device. They may also be used for the triggering, separated in time, of propellant charges assigned to an air bag system, which is likewise conventional. Expediently, transmission channel 4 is formed between status acquisition device 3 and control unit 5 by a conductor or by another bus system. In order to reduce the susceptibility to failure, it is expedient to transmit information, preferably a data record, that cannot be influenced from the outside if possible, via transmission channel 4 at regularly short time intervals. In practice, a data record of up to 3 bytes may be used, for example, which is transmitted regularly every 240 ms via a unidirectional line according to a special protocol.

It may be regularly necessary to check whether the devices built into a motor vehicle are working properly. This is achieved by a diagnosis. In FIG. 1, an outside diagnosis may be carried out regularly, using a diagnosis unit 10 which is able to be coupled to control unit 5 via a plug-to-socket connection 11. The present invention can naturally also be used in self-diagnosing systems, in which a diagnosis unit is stationary-mounted in the vehicle and permanently connected to control unit 5, or integrated into it. In the diagnosis case it may not only be necessary to determine whether the diagnosed devices are working properly, but also it may be necessary to record, for instance in a diagnosis protocol, of what kind the participating units are. The diagnosis protocol may contain data on the designation of the type of unit, the serial number of the unit, the manufacturing time, the installation time, the manufacturer of the unit, etc., so that it is able to carry out a systematic evaluation. In addition to the need to be able to determine whether units are faulty, and therefore have to be exchanged, it may also be meaningful for the motor vehicle manufacturer to receive statistical data on which units are especially delicate and/or by which vendors especially delicate or especially reliable units have been delivered.

Status acquisition devices such as status acquisition device 3 are generally stationary-mounted, and are accessible in the mounted state only with very great difficulty, particularly for reading the type label. This is therefore generally done without, or one can refer to the specification sheet that comes with the delivered vehicle, the danger being that a correction may not have been made if the unit was exchanged.

According to the present invention, in the diagnosis case, a stimulation signal is transmitted by control unit 5 to status acquisition device 3 via transmission channel 4, as shown in FIG. 2. A stimulation signal is a signal characterized by sides (edges) that are separated from one another by specified time intervals. In the example embodiment, the time intervals t1, t2, t3 and t4 are such that they do not correspond to time intervals of a usual clock pulse. That means that the occurrence of a stimulation signal is able to be uniquely detected.

When the stimulation signal occurs, status acquisition device 3 interrupts the regular transmission of the (first) data record corresponding to the recorded condition ("sleep-mode") and transmits instead a second data record which relates to the type characteristics of status acquisition device 3. The second data record includes 21 bytes, for example, as shown in FIG. 2, FIG. 3 representing a typical protocol of such a second data record according to an agreed code. This code is able to be decoded in control unit 5 and/or in diagnosis device 10. After the transmission of the second data record, status acquisition device 3 returns to the original work state (normal operation), namely the regular transmission of the first data record, in this case, the occupation state of seat surface 2 of seat 1, until a renewed stimulation signal is emitted by control unit 5 via transmission channel 4.

In the exemplary embodiment shown of a connectible outside diagnosis unit 10, the stimulation signal may, for instance, be triggered when diagnosis unit 10 is connected to control unit 5, or when diagnosis unit 10 emits a corresponding signal to control unit 5, for instance, automatically triggered by a diagnosis program, or manually triggered by a user. In the case of a self-diagnosis unit, the checking of the status acquisition device may, for example, be carried out each time the vehicle is put into operation, or at greater regular intervals during the running operation. If more than one status acquisition device is connected to control unit 5, corresponding stimulating signals may be transmitted simultaneously or displaced in time via respective transmission channels 4 to the respective status acquisition devices, in order to carry out corresponding diagnoses simultaneously or displaced in time.

Basically, the same procedure is always applicable if a regularly unidirectional, data-transmitting device is exceptionally supposed to transmit type data for diagnosis purposes and protocol purposes.

Consequently, in response to each diagnosis, without great effort, the type data of the diagnosed devices are also available, namely in the form of a data record which can be uniquely assigned, without problem, to the functional data of the respective device and can also be processed.

FIG. 2 shows a stimulation signal 12, which, upon triggering, begins at a point in time 0, and after a time t1 includes a pulse lasting for a time t2, after a further time t3 a pulse pause being ended. If, thereupon, stimulation signal 12 is again at a high level for a time duration t4, status acquisition device 3 recognizes this signal as stimulation signal 12.

This procedure has an influence on the data records that are transmitted to control unit 5 via transmission channel 4. At first, a first data record 13 is regularly transmitted, which, for example, includes 2 or 3 bytes, and which contains coded data on the recorded state, here the state of occupation of seat surface 2 of seat 1. As soon as status acquisition device 3 begins to receive a signal from control unit 5, it completes the transmission of first data record 13, and determines whether stimulation signal 12 is involved or not. In the given case, at the end of stimulation signal 12, second data record 14, which contains the type data, is then transmitted, after the end of this transmission of second data record 14 first data records 13 being regularly transmitted again.

The times given in FIG. 2 are, of course, exemplary, and the numbers of bytes of first data record 13 and also of second data record 14 are not tied to the given numbers. However, one may assume that second data record 14 requires clearly more bytes than first data record 13.

FIG. 3 shows a typical second data record 14, which begins with a start identifier and ends with an end identifier or stop identifier. After the start identifier, there follows the serial number of the respective status acquisition device 3. Customer data such as a customer serial number follows this. There then follow data concerning hardware (HW) versions and software (SW) versions, as well as data concerning manufacturing time of status acquisition device 3, concerning test data and concerning revised data of person classification (OC: occupant classification), that is, a corresponding algorithm version. Before the stop identifier, a check digit, such as a check sum, is still transmitted. Naturally, a different sequence of the data, and more or fewer, or even other such data are possible. Coding is performed by agreement, for example, BCD for the data and HEX for the identifiers or the like.

The invention claimed is:

1. A system, comprising:
a control unit configured to trigger a restraint system assigned to a seat of a vehicle in response to an event to be interpreted as an impact on an obstacle; and
a status acquisition device connected to the control unit via a transmission channels, the status acquisition device recording a condition for the triggering when the event is present, the status acquisition device configured to regularly transmit to the control unit via the transmission channel a data record corresponding to a presence or a non-presence of the condition, wherein the status acquisition device is configured to transmit to the control unit a second data record corresponding to type characteristics of the status acquisition device in response to a defined stimulation signal, the control unit configured to transmit the stimulation signal to the status acquisition device, and to supply the second data record received thereupon to a diagnosis device, in response to a diagnosis execution signal from the diagnosis device;
wherein the type characteristics identify the status acquisition device.

2. The system as recited in claim 1, wherein during the transmission of the second data record, the first data record is not transmitted.

3. The system as recited in claim 1, wherein the stimulation signal is formed by a specified sequence of high and low levels.

4. The system as recited in claim 1, wherein the diagnosis device is configured to be coupled to the control unit when necessary.

5. The system as recited in claim 1, wherein the transmission channel is connected to the control unit and to the status acquisition device in each case via a serial interface.

6. The system as recited in claim 1, wherein the transmission channel is a conductor.

7. The system as recited in claim 1, wherein the status acquisition device is designed to record occupation of a seat surface of the seat.

8. A method for a diagnosis of a system having a triggerable restraint system, a control unit for triggering the restraint system when an event is recorded that is to be interpreted as the impact on an obstacle, and a status acquisition device for recording a condition for the triggering of the restraint system when the event is present, the status acquisition device being connected to the control unit via a transmission channel, the method comprising:

regularly transmitting, by the status acquisition device, a first data record which designates a presence or non-presence of the condition;

transmitting by the control unit, and to the status acquisition device a defined stimulation signal via the transmission channel, when executing the diagnosis; and in response to a diagnosis execution signal from a diagnosis device;

transmitting, by the status acquisition device, a second data record corresponding to type characteristics of the status acquisition device to the control unit via the transmission channel, in response to the stimulation signal; and supplying, by the control unit, the second data record to the diagnostic device; wherein the type characteristics identify the status acquisition device.

9. The method as recited in claim 8, wherein during the transmission of the second data record, the first data record is not transmitted.

10. The method as recited in claim 8, wherein the stimulation signal is formed by a specified sequence of high and low levels.

* * * * *